(12) United States Patent
Duis et al.

(10) Patent No.: US 7,625,197 B2
(45) Date of Patent: Dec. 1, 2009

(54) DEVICES AND PROCESSES FOR PERFORMING DEGASSING OPERATIONS

(75) Inventors: Donnie J. Duis, Jacksonville, FL (US); Stephen R. Beaton, Jacksonville Beach, FL (US); David C. Byram, East Palatka, FL (US); Gregory Scott Duncan, Gainsville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 635 days.

(21) Appl. No.: 11/224,272

(22) Filed: Sep. 12, 2005

(65) Prior Publication Data
US 2007/0057397 A1    Mar. 15, 2007

(51) Int. Cl.
B29C 43/32    (2006.01)
(52) U.S. Cl. ............... 425/147; 425/210; 425/404; 425/812; 220/581; 220/202; 220/264
(58) Field of Classification Search .............. 425/135, 425/145–147, 149, 210, 404, 808, 812, 816, 425/DIG. 102; 220/581–592, 202–203.29, 220/264
See application file for complete search history.

(56) References Cited

U.S. PATENT DOCUMENTS

| | | | |
|---|---|---|---|
| 3,423,488 A | 1/1969 | Bowser | |
| 4,298,357 A * | 11/1981 | Pernic | 210/188 |
| 5,578,331 A | 11/1996 | Martin et al. | 425/445 |
| 5,656,208 A * | 8/1997 | Martin et al. | 425/808 |
| 5,753,150 A | 5/1998 | Martin et al. | |
| 5,871,566 A * | 2/1999 | Rutz | 95/46 |
| 6,695,988 B1 * | 2/2004 | Schlagel et al. | 425/445 |
| 6,740,139 B2 * | 5/2004 | Russell et al. | 95/8 |
| 6,883,675 B2 * | 4/2005 | Maenke | 220/203.11 |
| 7,334,708 B2 * | 2/2008 | Xu et al. | 222/190 |
| 7,383,964 B2 * | 6/2008 | Keller | 220/592.27 |
| 2004/0112008 A1 | 6/2004 | Voss et al. | 53/329.3 |

FOREIGN PATENT DOCUMENTS

| | | |
|---|---|---|
| EP | 0750982 | 1/1997 |
| WO | WO 98/32587 | 7/1998 |

OTHER PUBLICATIONS

PCT International Search Report, dated Jan. 18, 2007, for PCT Int'l Appln. No. PCT/US2006/034228.

* cited by examiner

Primary Examiner—Yogendra Gupta
Assistant Examiner—Thu Khanh T Nguyen

(57) ABSTRACT

A preferred process for degassing a mold piece includes inserting the mold piece into an internal volume within a canister, sealing the internal volume, drawing a vacuum in the internal volume, and introducing into the internal volume a gaseous fluid suitable for degassing the mold piece.

23 Claims, 16 Drawing Sheets

DEVICES AND PROCESSES FOR PERFORMING DEGASSING OPERATIONS

FIELD OF THE INVENTION

The invention relates generally to contact lenses and other products that require a substantially oxygen-free environment during manufacture. More particularly, the invention relates to devices and processes for isolating mold pieces and other objects used in the manufacture of such products from the ambient environment, so that the objects can be rendered substantially free of oxygen.

BACKGROUND OF THE INVENTION

Soft contact lenses are typically formed using a two-piece mold composed of a front mold half and a back mold half. The front and back mold halves are positioned so that they are spaced apart in a predetermined relationship. A monomeric material in liquid form is introduced in the gap between the front and back mold halves. The monomeric material, upon curing, forms the contact lens. The front and back mold halves are configured to shape the lens in a particular manner, so that the lens possesses optical properties that produce a desired vision correction in the end user.

The curing of the monomeric material is inhibited in the presence of oxygen. Hence, soft contact lenses are typically manufactured in an environment that is substantially free of oxygen. In addition, oxygen can permeate into the plastic material from which the front and back curves are formed, if the front and back mold halves are exposed to air. The oxygen needs to be removed from the front and back mold halves prior to use. The process by which the oxygen is removed is commonly known as "degassing."

Front and back mold halves are typically manufactured by injection molding. The front and back mold halves are usually produced in batches, or lots, with each lot corresponding to a lens shape providing a particular vision correction. The lots may be stored after manufacture, until needed in the production process.

The lots of front and back curves are usually exposed to the ambient environment during storage. Hence, each lot needs to be degassed prior to use. Degassing is commonly performed by placing the front and back mold halves in a vacuum chamber, and subjecting the front and back curves to a relatively high vacuum, such as one Torr or greater, for a prolonged period such as eight to twelve hours.

Degassing using a vacuum chamber can be disadvantageous because additional lots cannot be placed in the vacuum chamber without interrupting any ongoing degassing operations. Interrupting a degassing operation before completion usually necessitates restarting the degassing operation from the beginning. Hence, multiple vacuum chambers, each with attendant start-up and operating costs, may be needed to conduct degassing operations on a substantially continuous basis.

The degassed front and back mold halves may be temporarily stored in nitrogen-filled containers until needed on the production line. These containers typically lose nitrogen through leakage and additional nitrogen may need to be supplied to each container on a continuous basis. The nitrogen supply line associated with each container is usually coupled to the container using relatively expensive fittings. Moreover, it can be difficult or impossible to determine whether an adequate nitrogen charge is being maintained in the container during storage.

Consequently, a need exists for a device and a method for degassing front and back mold halves on a substantially continuous basis, and for storing the degassed front and back mold halves in a cost-effective manner that minimizes the potential for the front and back mold halves to be exposed to oxygen.

DETAILED DESCRIPTION OF PREFERRED EMBODIMENTS

Figure 1:
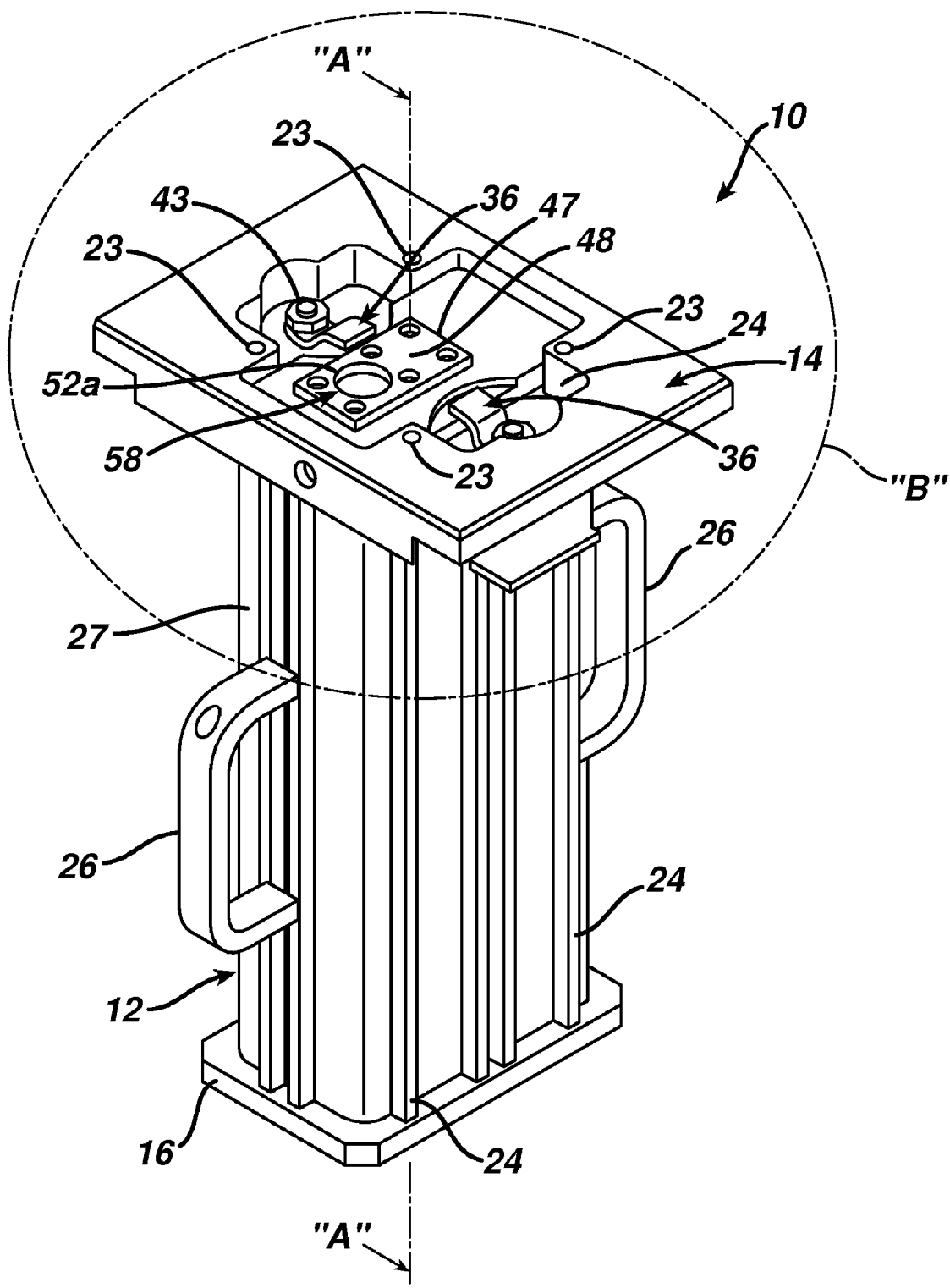
FIG. 1 is a perspective view of a canister that can be used to degas and store mold pieces.

Processes and devices are provided for degassing an object using a canister filled with a gaseous fluid such as nitrogen and, if desired, storing the object in the gaseous fluid after degassing.

In one embodiment, processes for degassing a mold piece are provided comprising, consisting essentially of and consisting of inserting the mold piece into an internal volume within a canister, sealing the internal volume, drawing a vacuum in the internal volume, introducing a gaseous fluid into the internal volume, and maintaining the gaseous fluid in the internal volume for a time period sufficient to degas the mold piece.

In another embodiment, a canister for degassing a mold piece is provided comprising, consisting essentially of and consisting of a substantially hollow body defining an internal volume, and a first and a second end portion secured to opposing ends of the body and further defining the internal volume. The first end portion has an opening formed therein for providing access to the internal volume so that the mold piece can be inserted into and removed from the internal volume.

In yet another embodiment, a canister comprises, consist essentially of, and consists of a lid capable of being secured to the first end portion on a selective basis for covering the opening, and at least one of a needle valve for allowing gaseous fluid to be introduced into and evacuated from the internal volume, and a membrane in fluid communication with the internal volume so that the membrane can provide an indication of a pressure differential between the internal volume and an ambient environment around the canister.

In still another embodiment, a device for degassing an object comprises, consist essentially of, and consists of a substantially tubular first portion having an interior for receiving the object, a second portion covering a first end of the first portion, and a third portion covering a second end of the first portion. The third portion has an opening formed therein for facilitating insertion and removal of the object into and out of the interior of the first portion.

A further embodiment is a device comprising, consisting essentially of and consisting of a valve for placing the interior of the first portion in fluid communication with at least one of a vacuum source and a source of gaseous fluid, and a pressure indicator responsive to a pressure differential between the interior and an exterior of the first portion.

In yet another embodiment a processes is provided comprising, consisting essentially of and consisting of: (i) placing an object in an internal volume within a canister; (ii) sealing the internal volume; (iii) drawing a vacuum in the internal volume for a first time period; (iv) introducing a gaseous fluid suitable for degassing the object into the internal volume and pressurizing the gaseous fluid for a second time period; (v) drawing a vacuum in the internal volume for a third time period; (vi) introducing an additional amount of the gaseous fluid into the internal volume and pressurizing the additional amount of the gaseous fluid for a fourth time period; (vii) repeating steps (iii) through (v); and (viii) subsequently introducing another additional amount of the gaseous fluid into the internal volume and pressurizing the another additional amount of the gaseous fluid for a fifth time period.

Another embodiment provides a system for performing degassing operations comprising, consisting essentially of, and consisting of a canister having an internal volume for holding an object to be degassed. The internal volume is capable of being sealed on a selective basis. The system also comprises a controller comprising a processor. The system further comprises a valve communicatively coupled to the controller for selectively placing the internal volume in fluid communication with at least one of a source of a gaseous fluid suitable for use in degassing, and a vacuum source, in response to an input from the controller.

FIGS. 1-6 and 12 depict a preferred embodiment of a canister 10. The canister 10 can be used for degassing and storing mold pieces. The mold pieces can be, for example, front and back curves 21 used in the manufacture of soft contact lenses. (The term "mold piece," as used in the specification and claims, is intended to encompass an entire mold, as well as pieces of a mold.) The use of the canister 10 in connection with the front and back curves 21 is disclosed for exemplary purposes only. The canister 10 can be adapted for use in degassing operations performed on other types of objects.

Directional terms such as "top," "bottom," "above," "below," etc. are used with reference to the component orientations depicted in FIG. 1. These terms are used for illustrative purposes only, and are not meant to limit the scope of the appended claims.

The canister 10 is composed of a body 12, a first end portion 14 secured to a first end of the body 12, and a second end portion 16 secured to a second end of the body 12. The body 12, first end portion 14, and second end portion 16 define a cavity, or internal volume 20 (see FIGS. 2 and 3).

The internal volume 20 accommodates the front and back mold halves 21. The canister 10 is sized so that the internal volume 20 accommodates one lot of either or both front and back mold halves 21. Each lot can include four hundred front mold halves 21, four hundred back mold halves 21, or some combination of front and back mold halves 21 totaling four hundred. Alternative embodiments of the canister can be sized so that the internal volume 20 accommodates more, or less than this number of front and back mold halves 21.

Figure 8:
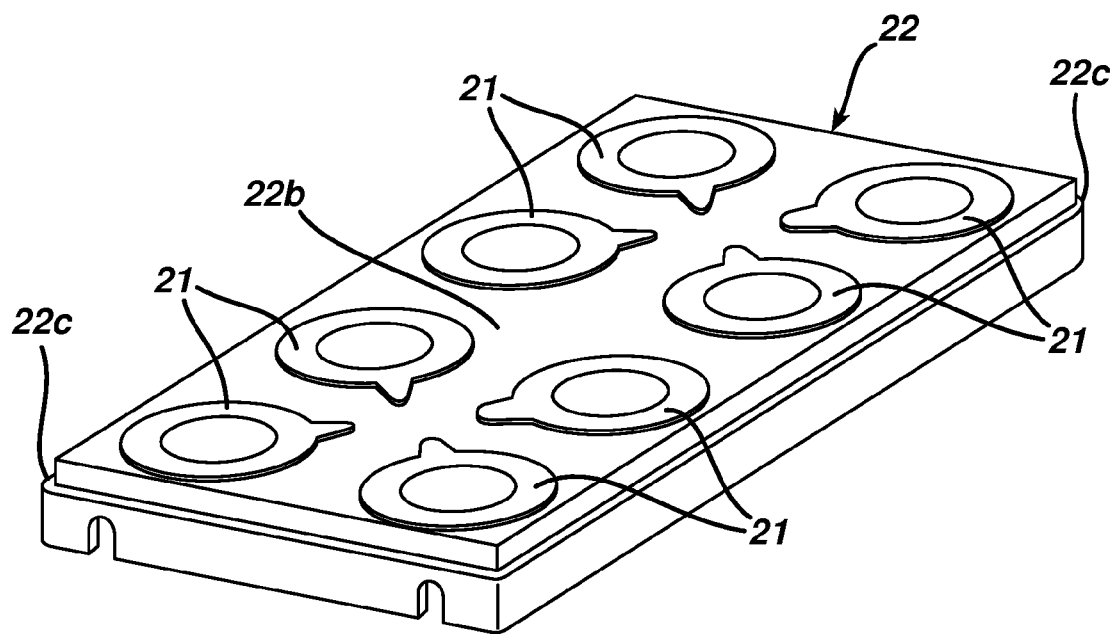
FIG. 8 is a top perspective view of a pallet that can be used in connection with the canister shown in FIGS. 1-6, with eight front or back mold halves placed thereon in preparation for inserting the pallet and front or back mold halves into the canister shown in FIGS. 1-6.

The front and back mold halves 21 are supported on pallets 22. Each pallet 22 can accommodate eight of the front or back mold halves 21, as shown in FIG. 8. Up to fifty of the pallets 22 can be stacked within the internal volume 20 during degassing operations, as discussed below.

Figure 2:
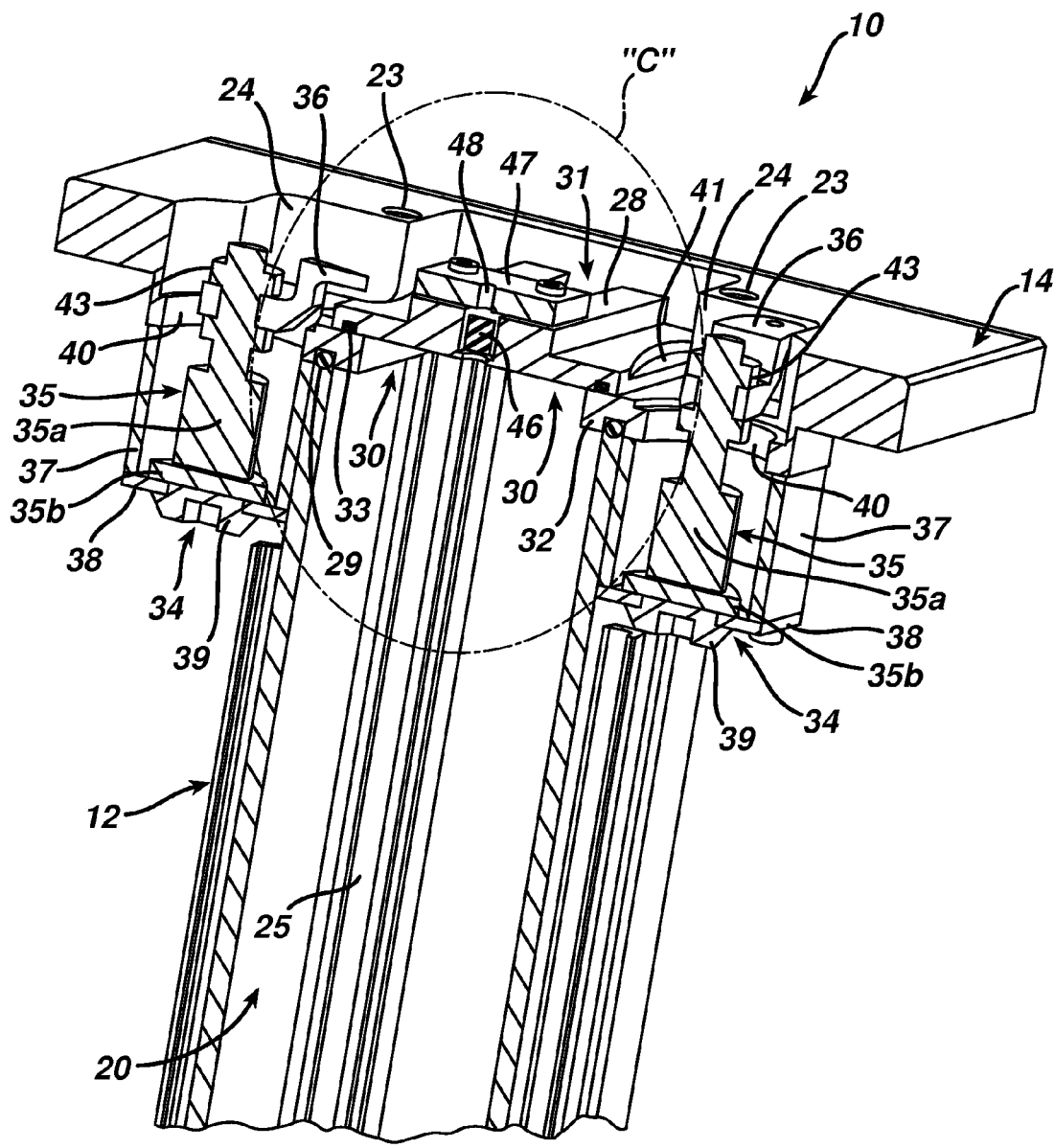
FIG. 2 is a cross sectional view of the area designated "B" in FIG. 1, taken along the line "A-A" of FIG. 1.
Figure 3:
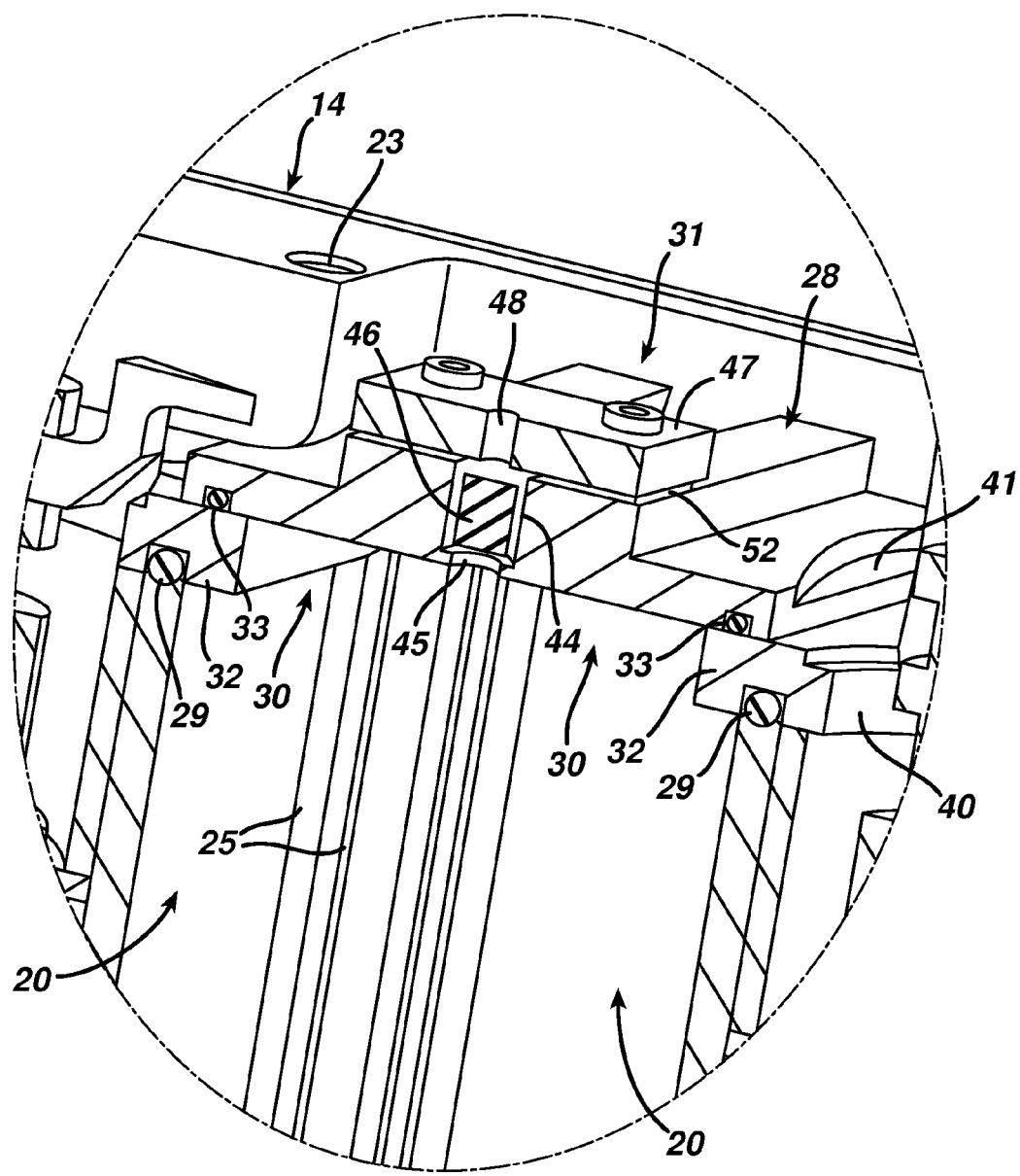
FIG. 3 is a magnified view of the area designated "C" in FIG. 2.

The body 12 is preferably formed, for example, from extruded aluminum that is hard coated. The body 12 preferably includes ribs 25, as shown in FIGS. 2 and 3. The ribs 25 are formed on inwardly-facing surfaces of the body 12, and thus project into the internal volume 20. The ribs 25 extend in an axial direction of the body 12. The ribs 25 are sized to contact the pallets 22 when the pallets 22 are stacked within the internal volume 20, so that the ribs 25 substantially center the pallets 22 within the internal volume 20.

Handles 26 are preferably mounted on opposing sides of the body 12, to facilitate lifting and handling of the canister 10. Each handle 26 is preferably disposed in an external track 27 formed on the body 12, so that the position of the handle 26 in relation to the body 14 can be adjusted.

The first and second end portions 14, 16 can be formed, for example, from aluminum. The first and second end portions 14, 16 are secured to the body 12 by a suitable means such as elongated fasteners 23 (see FIGS. 1-3). The fasteners 23 preferably extend between the first and second end portions 14, 16 by way of channels 24 formed in the body 12. In other words, the fasteners 23 preferably draw the first and second end portions 14, 16 toward each other, so that the body 12 is secured therebetween.

A seal 29 is disposed in a groove formed in an underside of the first end portion 14, to seal the interface between the first end portion 14 and the body 12 (see FIGS. 2 and 3).

The first end portion 14 has an opening 30 formed therein to facilitate access to the internal volume 20. The canister 10 includes a lid 28 for covering the opening 30. The lid is 28 is received in a recess 31 formed in the first end portion 14, as shown in FIGS. 2 and 3. The lid 28 is supported by a lip 32 of the first end portion 14. A seal 33 is disposed in a groove formed on an underside of the lid 28, to seal the interface between the lid 28 and the first end portion 14. The lid 28 and the first end portion 14 further define the internal volume 20.

The lid 28 can be secured to the first end portion 14 by, for example, clamps, or latches 34. Each latch 34 comprises a body 35, and an arm 36 (see FIGS. 2 and 3). The arm 36 is preferably secured to an upper portion 35a of the body 35 by a hexagonally-shaped nut 43.

The body 35 of each latch 34 is supported by a spacer 37, and a mounting plate 38. The spacer 37 and the mounting plate 38 are secured to the first end portion 14 using fasteners; A lower portion 35b of the body 35 is secured to the associated mounting plate 38 by a nut 39 that threadably engages the lower portion 35b. The lower portion 35b is rotatably coupled to the upper portion 35a of the body 35. This arrangement permits the upper portion 35a of the body 35, and the associated arm 36 to pivot in relation to the lower portion 35a, the spacer 37, the mounting plate 38, and the first end portion 14. The upper portion 35a of the body 35 extends through an associated opening 40 formed in the first end portion 14.

Each arm 36 (and the attached upper portion 35a of the body 35) can pivot between a first position (shown in FIG. 1) and a second position (not shown). Each arm 36 engages a surface portion 41 of the lid 28 as the arm 36 pivots toward its first position. Interference between the arms 36 and the surface portions 41 secures the lid 28 to the first end portion 14.

The arms 36 pivot away from the lid 28 when the arms 26 are moved to their second positions, so that the lid 28 can be removed from the first end portion 14 to expose the opening 30. The first end portion 14 has cutouts 24 formed therein to accommodate the arms 36 as the arms 36 move to their respective second positions (see FIGS. 1 and 2). The arms 36 can be pivoted using a handle or other tool configured to engage the nuts 43.

Each of the bodies 35 can be equipped with camming features (not shown) that cause the body 35 to urge its associated arm 36 downward as the arm 36 approaches the first position.

Figure 10:
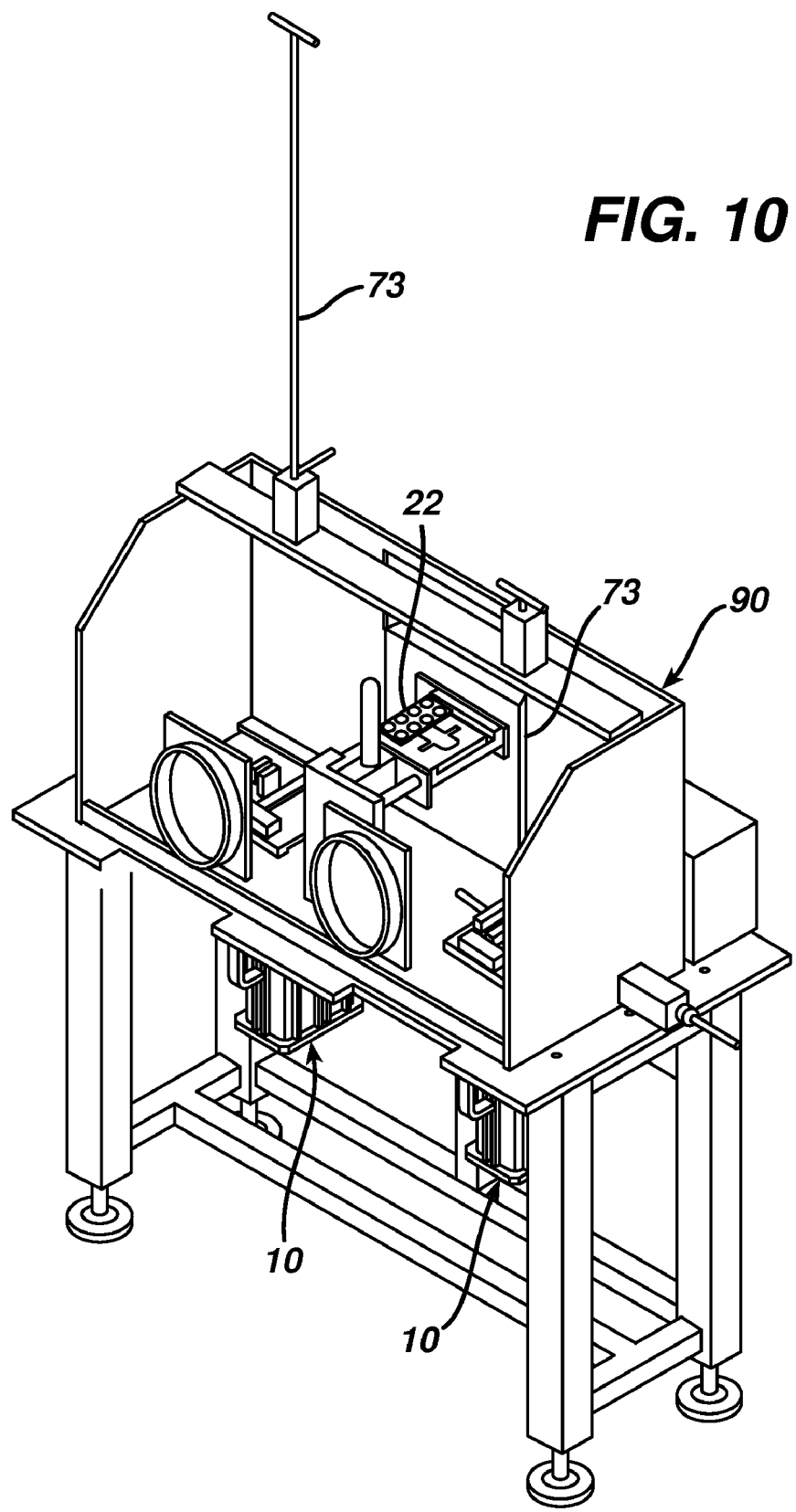
FIG. 10 is a top perspective view of a glove box mated with two canisters of the type shown in FIGS. 1-6.
Figure 11:
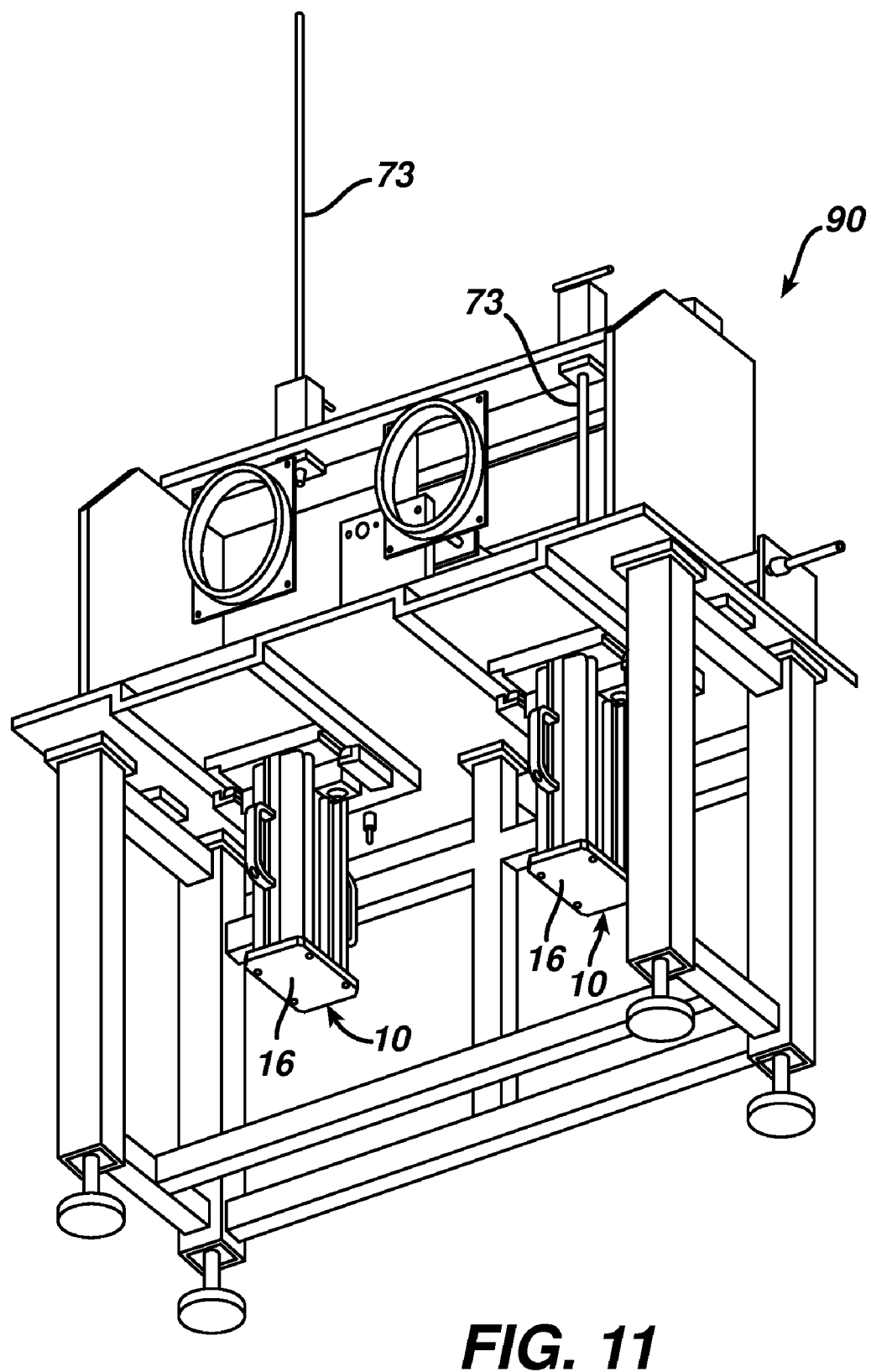
FIG. 11 is a bottom perspective view of the glove box and canisters shown in FIG. 10.

The first end portion 14 can be configured to securely mate with a nitrogen-filled container, such as a glove box 90, so that a sealed interface is formed between the canister 10 and the glove box 90 (see FIGS. 10 and 11; portions of the glove box 90 are removed in these illustrations, for clarity). Once the canister 10 and the glove box 90 are mated, the lid 28 can be removed so that the front and back curves 21 can be unloaded from the canister 10 in a substantially oxygen-free environment. The front and back curves 21 can subsequently be moved to a production area for use in manufacturing soft contact lenses.

The lid 28 has a through hole 44 formed therein to provide access to the internal volume 20, as shown in FIGS. 2-5. A valve 46 is disposed in the through hole 44. The valve 46 is preferably a needle valve, although other types of valves can be used in the alternative. The valve 46 seals the through hole 44, while permitting gases to be introduced-into, and evacuated from the internal volume 20 on a selective basis using a needle injector 49 (see FIG. 7).

Figure 7:
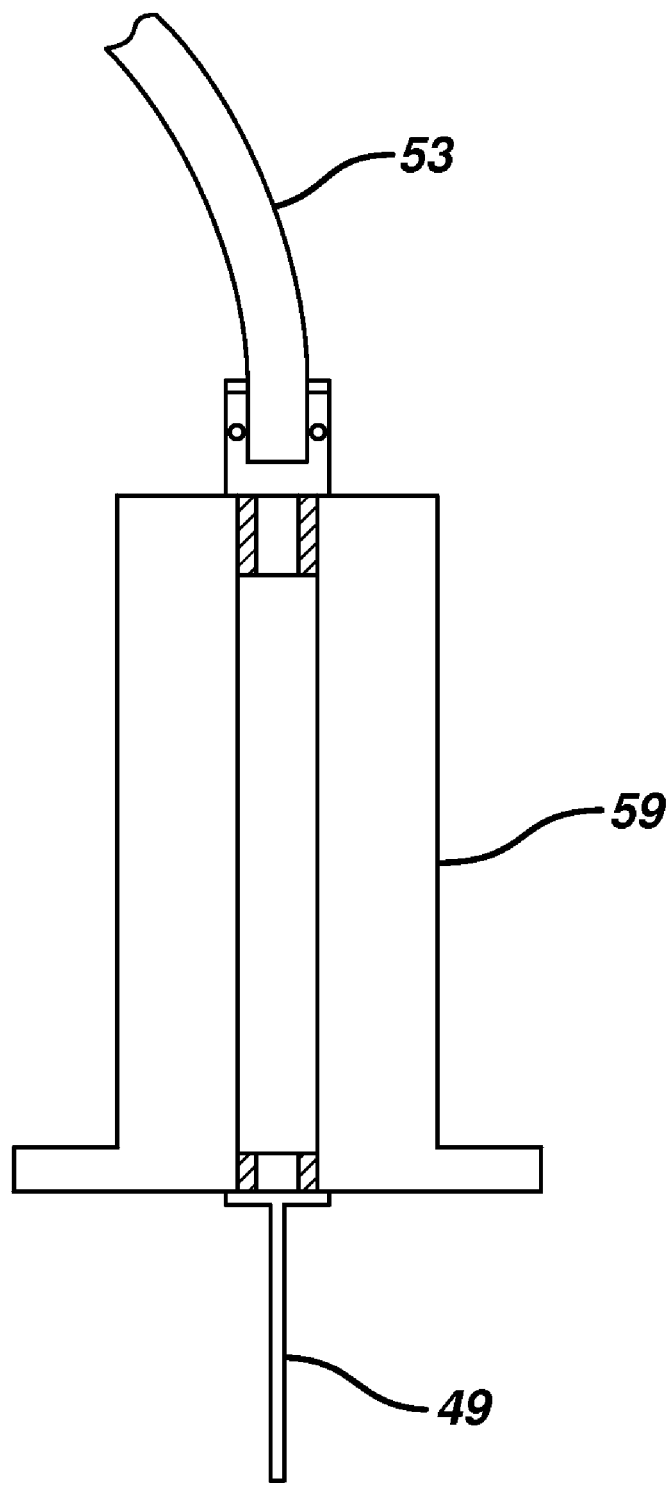
FIG. 7 is a cross-sectional view of the needle injector shown in FIG. 5.

The needle injector 49 can be attached to a handle 59, as depicted in FIG. 7. The handle 59 can be formed, for example, from rolled aluminum. The handle 59 can be grasped by the user so that the user can insert the needle injector 49 into the valve 46. The handle 59 can also be used to facilitate connection of the needle injector 49 to tubing 53 that supplies gaseous fluid to the needle injector 49, or draws a vacuum through the needle injector 49.

Figure 5:
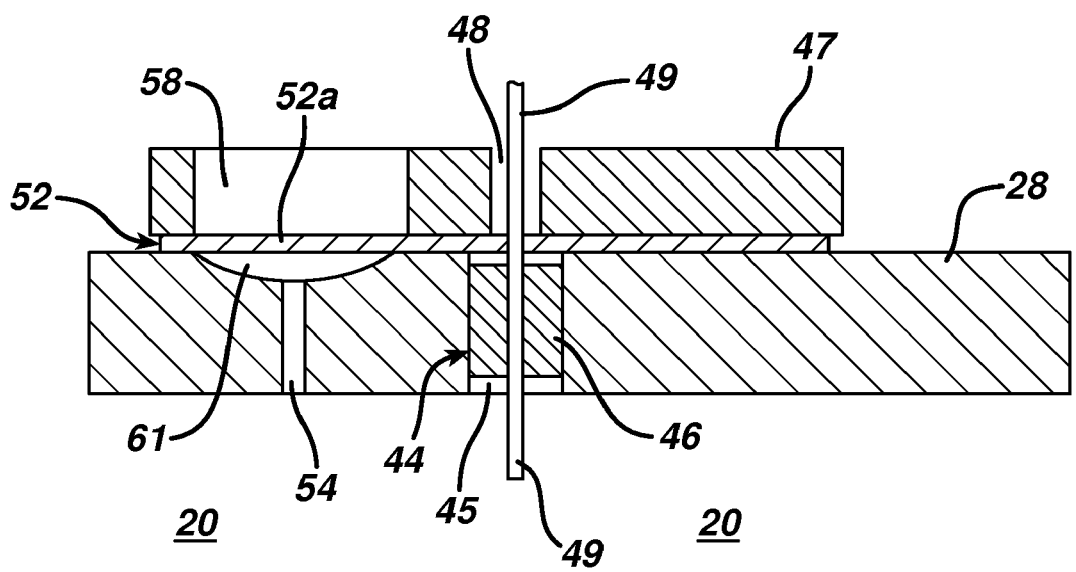
FIG. 5 is a cross-sectional, assembled view of the lid, membrane, and plate shown in FIG. 4, taken through the line "D-D" of FIG. 4 and showing a portion of a needle injector being inserted through the lid, membrane, and plate.

A lip 45 is formed around the through hole 44, proximate the bottom thereof, as shown in FIGS. 3, and 5. The lip 45 supports the valve 46.

A plate 47 is securely mounted on the lid 28, using a suitable means such as fasteners (see FIGS. 1-5). The plate 47 helps to retain the valve 46 in the through hole 44. In particular, the plate 47 has a through hole 48 formed therein. The centerline of the through hole 48 is substantially coincident with the centerline of the through hole 44 formed in the lid 28, as shown in FIG. 5. The through hole 48 has a diameter smaller than that of the valve 46 (but large enough to facilitate the access to the valve 46 by the needle injector 49). This feature results in interference between the valve 46, and the portion of the plate 47 proximate the through hole 48. The noted interference helps to retain the valve 46 in the through hole 44.

The valve 46 is preferably formed as a piece of resilient material such as rubber. The resilient material has a penetration formed therein for permitting the tip of the injector 49 to pass through the valve 46, and into the internal volume 20. The resilience of the material causes the penetration to remain sealed when the needle injector 49 is not inserted therein. The resilience of the material also causes the valve 46 to self seal around the needle injector 49, when the needle injector 49 is inserted therein. The valve 46 is preferably sized to fit snugly within the through hole 44, so that a seal is established between the valve 46 and the periphery of the through hole 44.

Gases can be evacuated from, or introduced into the internal volume 20 by way of the needle injector 49, once the needle injector 49 is inserted through the valve 46. For example, air within the internal volume 20 can be evacuated through the needle injector 49. Nitrogen gas can subsequently be introduced into the internal volume 20 by way of the needle injector 49. Preferably, the nitrogen gas is pressurized to a level above the ambient air pressure, to inhibit inflow of ambient air into the internal volume 20.

The nitrogen environment within the internal volume 20 can be maintained for a predetermined period, to allow the front and back curves 21 to soak in the nitrogen and thereby degas. The nitrogen, and oxygen that has migrated out of the plastic material from which the front and back curves 21 are formed, can be evacuated from the internal volume 20 by way of the injector needle 49 at the conclusion of the soak period. If desired, additional nitrogen can be introduced to the internal volume by way of the needle injector 39, and another soak period can be conducted to further degas the front and back curves 21.

The use of nitrogen gas to perform the degassing operation is disclosed for exemplary purposes only. Other gaseous fluids suitable for degassing the front and back curves 21, including gaseous fluids comprising a blend of nitrogen and oxygen, can be used in the alternative.

The needle injector 49 can remain inserted in the valve 46 during the soak period. Alternatively the needle injector 49 can be removed after the nitrogen has been introduced, and reinserted at the conclusion of the soak period to evacuate the nitrogen.

The front and back mold halves 21 can be removed from the canister 10 at the conclusion of the final soak period, using the glove box 90 or other suitable means to isolate the front and back mold halves 21 from oxygen. Alternatively, the pressurized nitrogen can remain in the canister 10, and the canister 10 and the front and back mold halves 21 can be stored until the front and back mold halves 21 are needed for production operations.

Figure 4:
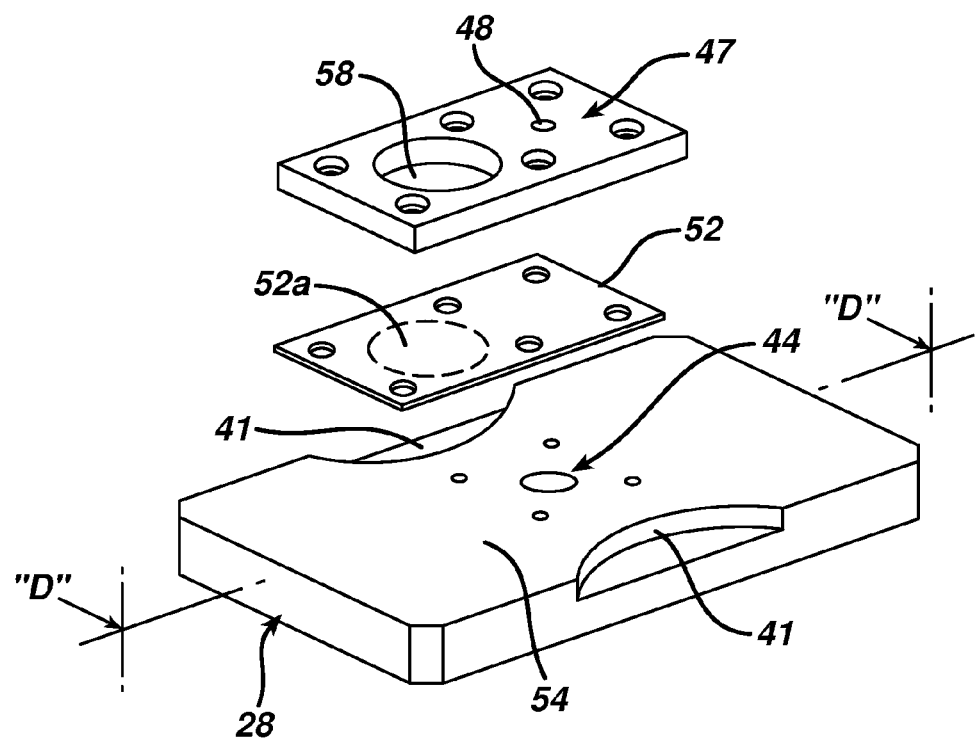
FIG. 4 is an exploded perspective view of a lid, a membrane, and a plate of the canister shown in FIGS. 1-3.

The canister 10 can be equipped with a membrane 52 for providing an indication that the internal volume 20 is pressurized (see FIGS. 3-5). The membrane 52 is preferably formed from a resilient, flexible material such as rubber. The membrane 52 is mounted on the lid 28. A through hole 54 is formed in the lid 28, to place the underside of the membrane 52 in fluid communication with the internal volume 20.

The membrane 52 is held on the lid 28 by the plate 47. More particularly, the membrane 52 is sandwiched between the plate 47 and the lid 28. (The portion of the membrane 52 below the through hole 48 has a slit formed therein, to permit the needle injector 49 to pass through the membrane 52.)

The plate 47 has a second, relatively large through hole 58 formed therein for facilitating access to the membrane 52 (see FIGS. 1, 4, and 5). The centerline of the through hole 58 is substantially coincident with the centerline of the through hole 54 formed in the plate 28.

A portion 52a of the membrane 52 is aligned with the through hole 58. The underside of the portion 52a is in fluid communication with the internal volume 20 by way of the through hole 54. The pressurized nitrogen within the internal volume 20 thus acts on the membrane portion 52a, by way of the through hole 54. This pressure, in conjunction with the restraining effect of the plate 47 on the perimeter of the membrane portion 52a, causes the membrane portion 52a to rise, or curve upward, when the internal volume 20 is pressurized. In other words, the membrane portion 52a can act as a pressure bubble when the internal volume 20 is pressurized.

The upward curve of the membrane portion 52a can provide both a visual and a tactile indication whether the internal volume 20 is charged with nitrogen (or another gaseous fluid). This indication can be utilized as the internal volume 20 is being charged in preparation for a soak period. The indication can also be used to verify that the internal volume 20 remains charged during a soak period, or during storage.

The surface portion of the lid 28 located below the membrane portion 52a preferably has a convex shape that forms an indentation 61, as shown in FIG. 5. The indentation 61 permits the user to push the membrane portion 52a down after the internal volume 20 has been depressurized. This feature can be used if the membrane portion 52a stretches and deforms, and no longer returns to its initial flat shape on its own.

Figure 6:
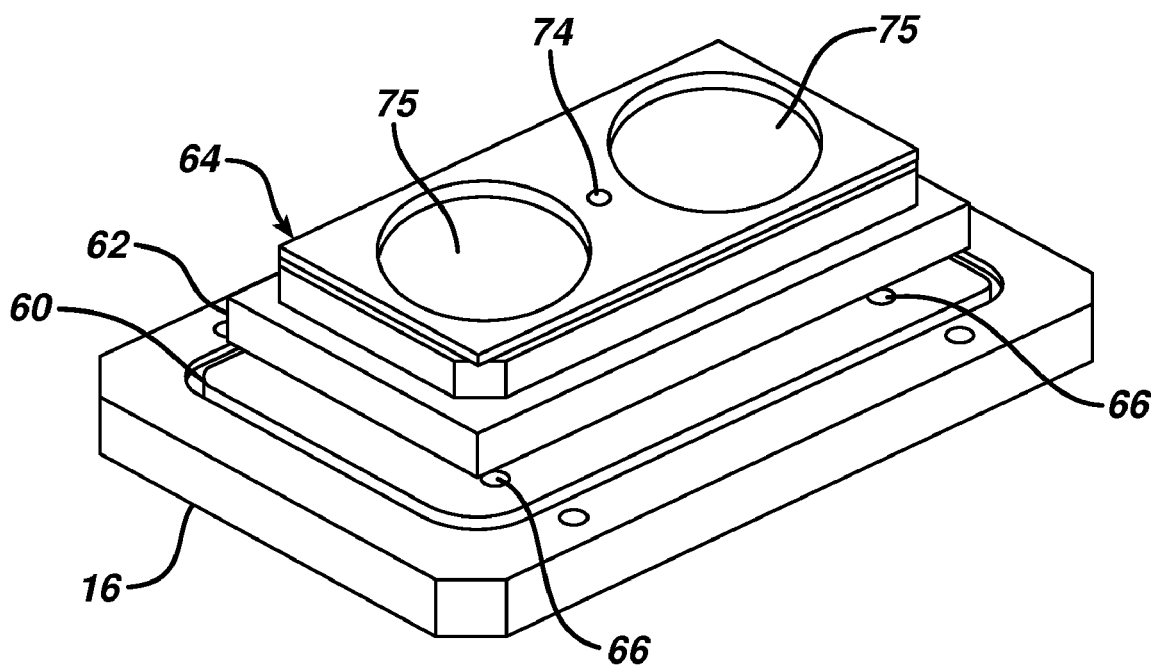
FIG. 6 is a perspective view of a second end portion, and a first and second plate of the canister shown in FIGS. 1-5.

A seal 60 is disposed in a groove formed in an inwardly-facing surface of the second end portion 16, to seal the interface between the second end portion 16 and the body 12 (see FIG. 6).

The canister 10 also includes a first plate 62 and a second plate 64 for supporting the pallets 22 of front and back curves 21 within the internal volume 20. The first plate 62 is preferably supported on the second end portion 16 by way of springs 66, as shown in FIG. 6. The second plate 64 rests on top of the first plate 62, and is not secured to the first plate 62.

Figure 12:
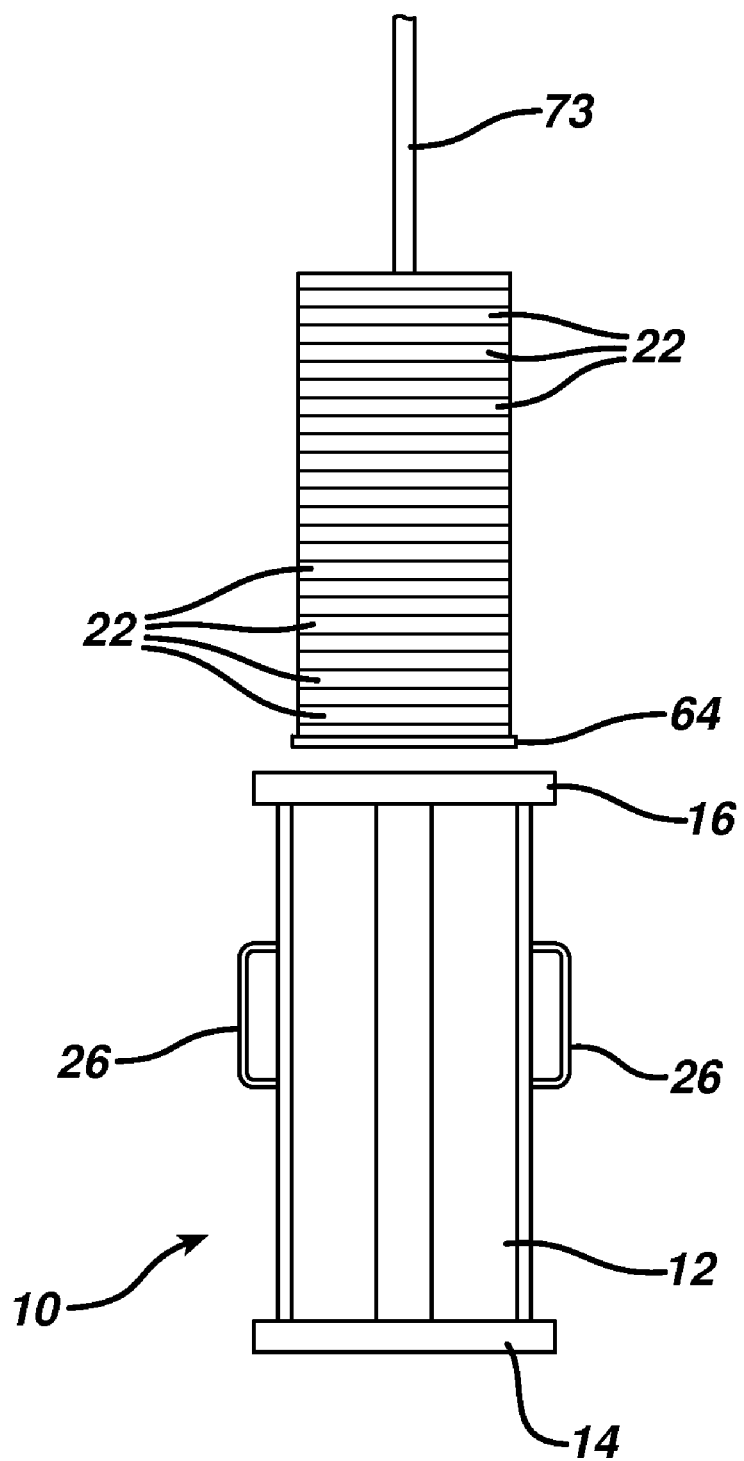
FIG. 12 is a side view of the canister shown in FIGS. 1-6, depicting a stack of pallets of the type shown in FIGS. 8 and 9 being loaded into or removed from the canister.

The second plate 64 can be removed from the canister 10 so that the pallets 22 of front and back curves 21 can be loaded onto the second plate 64 outside of the canister. More particularly, a rod 73 having a threaded end portion can be inserted into the canister 10 by way of the opening 30 in the first end portion 14 (the rod 73 is depicted in FIGS. 10-12). The rod 73 can be secured to the second plate 64 by way of a threaded hole 74 formed in the second plate 64, proximate the center thereof (see FIG. 6). The rod 73 and the attached second plate 64 can then be lifted from the internal volume of the canister 10.

Figure 9:
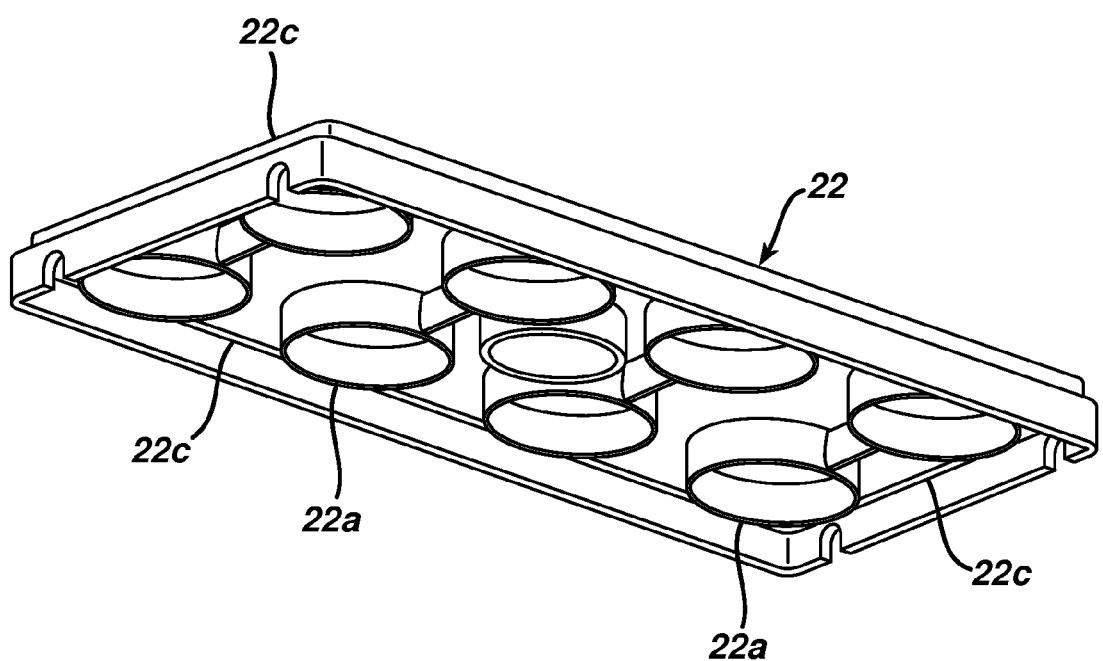
FIG. 9 is a bottom perspective view of the pallet and front or back mold halves shown in FIG. 8.

One of the pallets 22 can be stacked directly on the second plate 64, as shown in FIG. 12. The pallets 22 have downwardly-facing cylindrical projections 22a formed thereon, as shown in FIG. 9. The second plate 64 has recesses 75 formed therein to accommodate the front and back curves 21 disposed on the lowermost pallet 22 (see FIG. 6). The remaining pallets 22 can be stacked on top of the second plate 64 and the lowermost pallet 22, as shown in FIG. 12. Each pallet 22 has a through hole 22b formed proximate a center thereof for permitting the rod 73 to pass through the pallet 22 as the pallets 22 are stacked (see FIG. 8). Moreover, the pallets 22 include features 22c that permit the pallets 22 to be stacked on top of each other.

The canister 10 is sized so that the internal volume accommodates up to fifty of the pallets 22. A particular number of pallets 22 is specified for exemplary purposes only. Alternative embodiments of the canister 10 can be sized to hold more, or less than fifty pallets 22. Moreover, alternative embodiments can be configured for use with other type of pallets, or without the use of any pallets whatsoever.

The second plate 64 and the stack of pallets 22 can be lifted by way of the rod 73, and lowered into the internal volume 20 through the opening 30 in the first end portion 14, as depicted in FIG. 12. The rod 73 can subsequently be unthreaded and removed from the second plate 64. The lid 28 can then be positioned in the opening 30, and secured in place by turning the latches 34 to their respective first positions.

The springs 66 urge the first plate 62 upward, toward the first end portion 14. The springs 66 thus exert an upward force on the stack of pallets 22, when the canister 10 is loaded. This force urges the uppermost pallet 22 against the lid 28, once the lid 28 is installed and secured. In other words, the springs 66 place a relatively low compressive force on the stack of pallets 22. This feature can help the pallets 22 to remain substantially stationary in relation to the canister 10 when the canister 10 is bounced, dropped, knocked over, or otherwise moved.

The pallets 22 can be removed from the internal volume 20 after the conclusion of degassing operations by removing the lid 28, threading the rod 73 to the second plate 64, and lifting the second plate 64 and the stacked pallets 22 by way of the rod (se FIG. 12).

Figure 13:
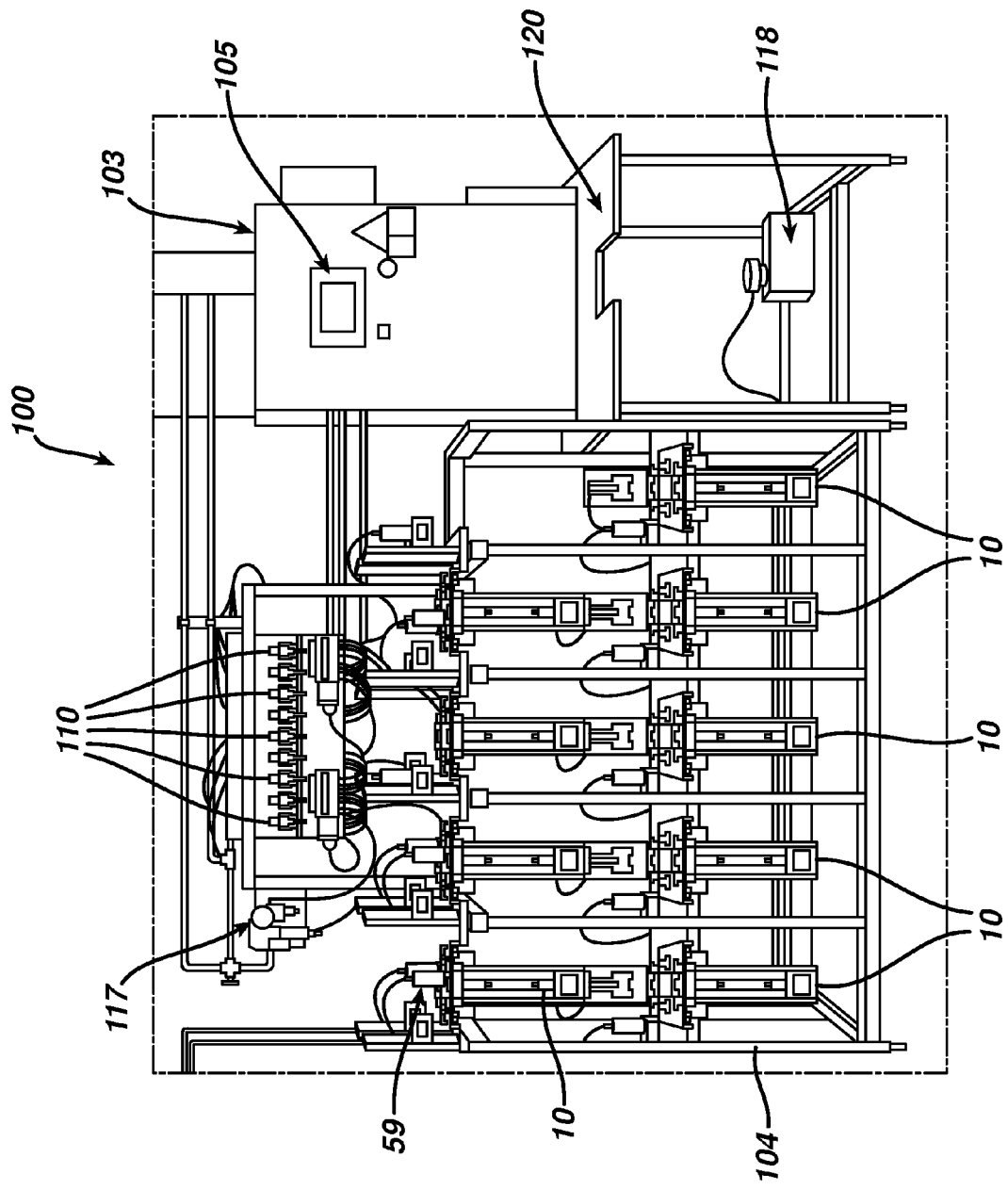
FIG. 13 is a front view of a preferred embodiment of a system for conducting degassing operations using canisters of the type shown in FIGS. 1-6 and 12.
Figure 14:
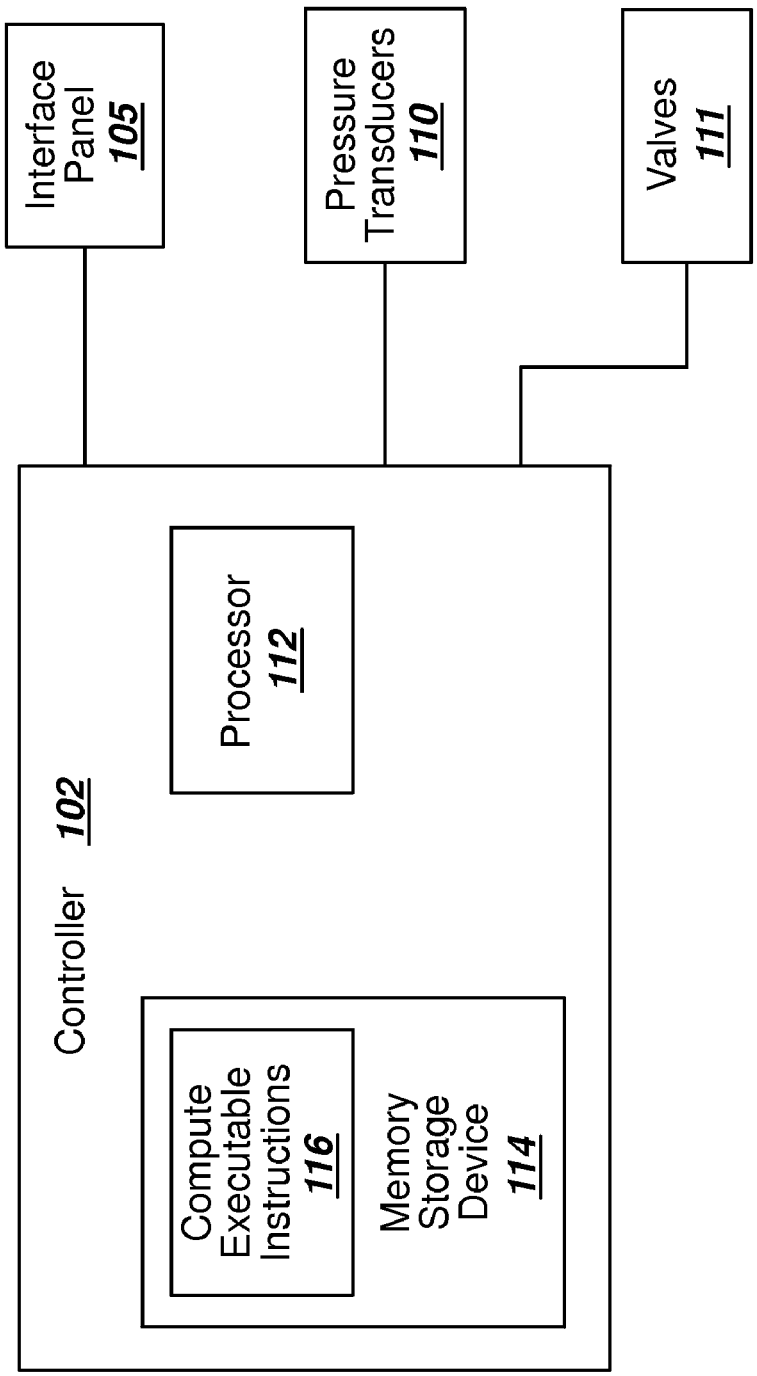
FIG. 14 is a block diagram of electrical components of the system shown in FIG. 13.

FIGS. 13 and 14 depict a preferred embodiment of a system 100 for conducting degassing operations using one or more of the canisters 10. The system 100 comprises a controller 102, a console 103 for housing the controller 102, and a plurality, e.g., twenty, of the canisters 10. The system 100 also comprises a rack 104 for holding the canisters 10 and the console 103.

The system 100 further includes a plurality of needle injectors such as the needle injectors 49, a vacuum pump 118, a plurality of pressure transducers 110, and a plurality of valves 111.

The pressure transducers 110 preferably have switching capability. The vacuum pump 118, the valves 111, and the pressure transducers 110 are mounted on the rack 104. The pressure sensors 110 and the valves 111 are each communicatively coupled to the controller 102.

Each needle injector 49 is associated with a corresponding one of the canisters 10. Each needle injector 49 is in fluid communication with the output of an associated one of the valves 111 by way of tubing. An associated one of the pressure transducers 110 is in fluid communication with the outlet of each valve 111 by way of a T-fitting (or other suitable fitting) connected to the tubing.

The valves 111 are configured to accept two fluid inputs. In particular, each valve 111 is in fluid communication with a source of pressurized nitrogen (not shown) by way of a pressure regulator 117. Each valve 111 is also in fluid communication with the vacuum pump 118.

The controller 102 comprises a processor 112, memory storage device 114 communicatively coupled to the processor 112, and a set of computer-executable instructions 116 stored on the memory storage device 114 (see FIG. 14). The processor 112 can be a microprocessor or other suitable type of processor.

The controller 102 can generate electrical outputs that control the operation of the valves 111. Each valve 111, in response to the output of the controller 102, can open to place the associated canister 10 in fluid communication with the nitrogen source, while continuing to isolate the canister 10 from the vacuum source. Alternatively, the valve 111 can open to place the associated canister 10 in fluid communication with the vacuum source, while continuing to isolate the canister 10 from the nitrogen source.

Degassing operations can be conducted using the system 100 as follows. Each canister 10 can be loaded with a stack of the pallets 22 and sealed, in the above-discussed manner. The rack 104 can be equipped with a shelf 120 for supporting the canister 10 during loading.

The loaded canister 10 can be placed on the rack 104. The rack 104 preferably includes features that securely engage the first end portion 14, so that the canister 10 is suspending by way of the first end portion 14. An associated needle injector 49 can subsequently be inserted into the internal volume 20 of the canister 10 by way of the valve 46.

The console 103 can be equipped with an interface panel 105 that includes a keypad, and various displays. The interface panel 105 can be used to activate the controller 102 to commence the degassing operation on a particular one of the canisters 10.

The degassing operation can be conducted in two cycles. The first cycle purges a substantial portion of the oxygen from the internal volume 20 and the front and back curves 21, so that the second cycle can be conducted while the level of oxygen in the internal volume is at a level, e.g., 0.5 percent or less, suitable for degassing operations.

The first cycle can be commenced by using the keypad of the interface panel 105 to select the particular canister 10 to be processed. The controller 102 subsequently generates an output that causes the valve 111 associated with that canister 10 to open, so that the internal volume 20 of the canister 10 is placed in fluid communication with the nitrogen source by way of the needle injector 49. The controller 102 verifies that the nitrogen is being directed to a sealed canister 10 by monitoring the back-pressure registered by the pressure regulator 117. In particular, the controller 102 verifies that the pressure of the nitrogen being directed to the canister 10 reaches a predetermined threshold, e.g., approximately 2.0 pounds per square inch (13.7 kPA), as indicated by a discrete output generated by the associated pressure transducer 110.

Once the controller 102 has verified that the nitrogen is being directed to a sealed canister 10, the controller 102 generates an output that causes the valve 111 isolate the canister 10 from the nitrogen source, and place the canister 10 in fluid communication with the vacuum pump 118. The internal volume 20 of the canister 10 is then maintained at a vacuum of approximately 22 inches of mercury (−75 kPA) or greater, for approximately three minutes, as indicated by another discrete output generated by the associated pressure transducer 110.

At the conclusion of the three-minute period, the controller 102 generates an output that causes the valve 111 to isolate the canister 10 from the vacuum pump 118, and place the canister 10 in fluid communication with the nitrogen source. The nitrogen in the internal volume 20 of the canister 10 is then maintained at a pressure between approximately 2.0 pounds per square inch (13.7 kPA) and approximately 2.5 psi (17.2 kPA), for approximately five seconds.

At the conclusion of the five-second period, the controller 102 generates an output that causes the valve 111 to isolate the canister 10 from the nitrogen source, and place the canister 10 in fluid communication with the vacuum pump 118. The internal volume 20 of the canister 10 is again maintained at a vacuum of approximately 22 inches of mercury (−75 kPA) or greater, for approximately three minutes.

At the conclusion of the three-minute period, the controller 102 generates an output that causes the valve 111 to isolate the canister 10 from the vacuum pump 118, and place the canister 10 in fluid communication with the nitrogen source. The nitrogen in the internal volume 20 of the canister 10 is then maintained at a pressure between approximately 2.0 psig and approximately 2.5 psig for approximately two hours.

The first cycle ends with the conclusion of the two-hour soak period. As noted above, it is believed that the oxygen level within the internal volume 20 will be purged to a level at or below approximately 0.5 percent at the conclusion of the first cycle.

The second cycle is subsequently performed in response to control inputs from the controller 102. The second cycle is performed in a manner subsequently identical to the first cycle, with the exception that a soak period of approximately six hours, rather than two hours, is performed at the conclusion of the second cycle. In other words, the nitrogen in the internal volume 20 of the canister 10 is maintained at a pressure between approximately 2.0 psig and approximately 2.5 psig for approximately six hours during the final portion of the second cycle, to further degas the front and back curves 21 within the canister 10.

Upon completion of the second cycle, the controller 102 causes the interface panel 105 to generate an indication that the degassing operation is complete for that particular canister 10. The system 10 will continue to maintain the nitrogen within the canister at a pressure between approximately 2.0 psig and approximately 2.5 psig until the needle injector 49 is removed, or until an input is given to the controller 102 via the interface panel 105 to end the flow of nitrogen to the canister 10. The canister 10, and the enclosed front and back curves 21, can thus be stored on the rack 104 while the nitrogen charge within the canister 10 is automatically maintained by the system 100.

Alternatively, the canister can be removed from the rack 104 and stored at another location until needed, so that the system 10 can be used on a substantially continuous basis to degas other sets of front and back curves 21 in other canisters 10. The membrane 52 can be used during the off-rack storage period to provide an indication that the nitrogen charge is being maintained within the canister 10.

The above-described degassing operation is described in detail for exemplary purposes only. The system 100 can be used to conduct other types of degassing operations, including operations that include more, or less than two cycles.

The use of the canisters 10 can facilitate degassing operations on a substantially continuous basis, and in a cost-effective manner. For example, the use of an individual canister 10 to degas a single lot of front and back mold halves 21 can obviate the need to interrupt degassing operations to add additional front and back mold halves 21 to the degassing operation, as may be required when relatively large vacuum chambers are used to degas multiple lots of front and back mold halves. Thus, the potential for interruption of production operations due to an inadequate supply of degassed front or back mold halves 21 can be lowered by the use of the canisters 10 in lieu of a vacuum chamber. Moreover, the costs and practical difficulties associated maintaining a relatively high vacuum for a prolonged period can be eliminated by degassing the front and back mold halves using a nitrogen blanket contained within the canisters 10.

The canisters 10 can be manufactured at a relatively low cost. For example the use of a relatively inexpensive needle valve 46 can provide the canister 10 with a cost advantage in relation to containers that use relatively expensive fittings for connecting the canister to a nitrogen source.

The construction of the canisters 10, it is believed, reduces the potential for leakage of the nitrogen charge. In addition, the relatively inexpensive membranes 52 can provide a reliable, easily-discernable indication that the canisters 10 are adequately charged with nitrogen. Hence, that the canisters 10 can be stored off-line, i.e., without being connected to a nitrogen source, with minimal potential for the front and back mold halves 21 to be contaminated by oxygen due to leakage of the nitrogen charge. Moreover, the canister 10 is configured to mate directly with a nitrogen-filled glove box 90 or other device, further reducing the potential for contamination of the front can back mold halves 21.

The use of the canisters 10 for both degassing and storage can eliminate the time, effort, and risk of contamination associated with transferring the front and back curves 21 from a degassing chamber to a suitable storage container. The canisters 10 are relatively compact and lightweight, and thus can be loaded, moved to and from a storage area, and unloaded with relative ease. Moreover, the lid 28 and the latches 34 can facilitate access to the internal volume 20 with relative ease. This feature can be particularly helpful when the canister 10 is being loaded and unloaded in a container such as the glove box 90.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

Figure 15:
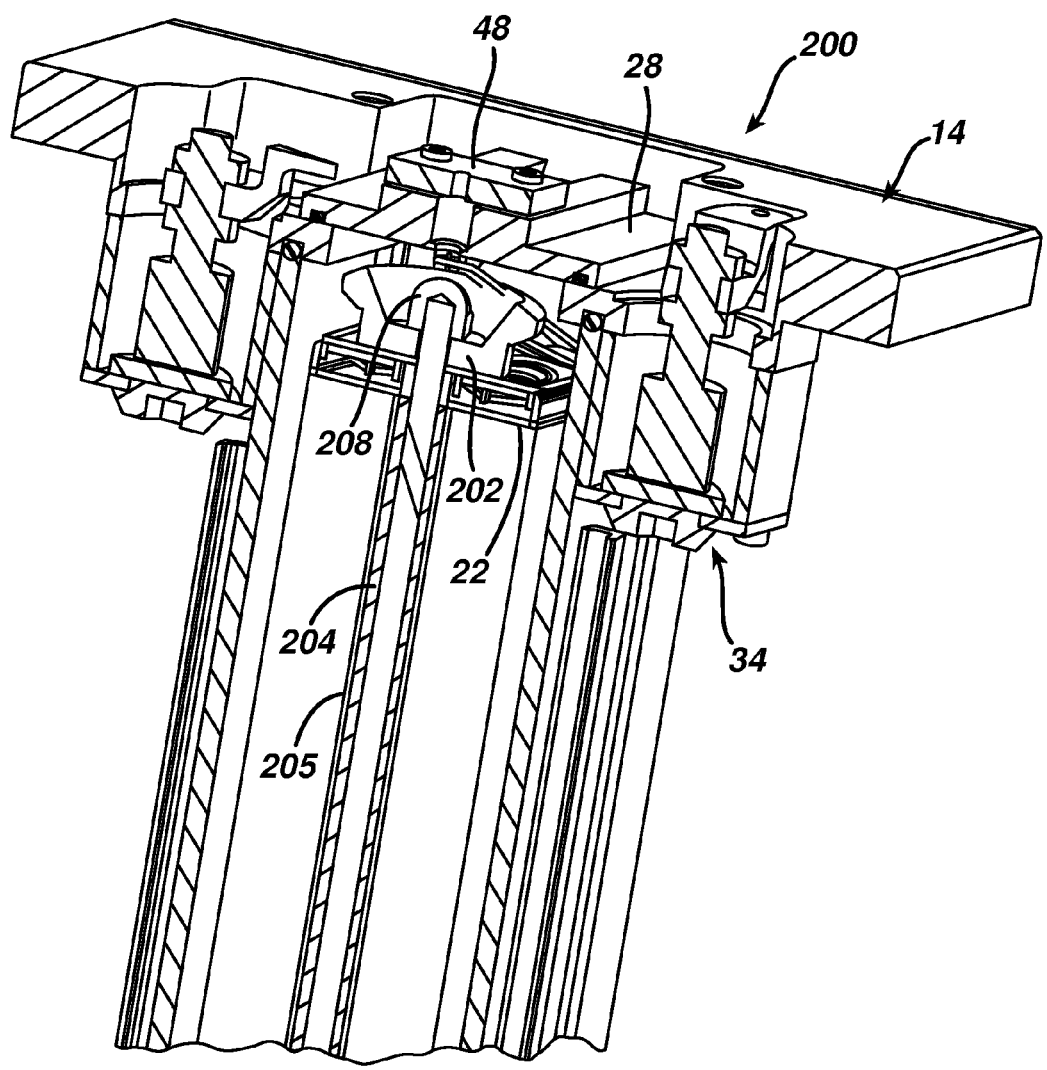
FIG. 15 is a cross-sectional view of an alternative embodiment of the canister shown in FIGS. 1-6 and 12, from a perspective similar to that of FIG. 2.
Figure 16:
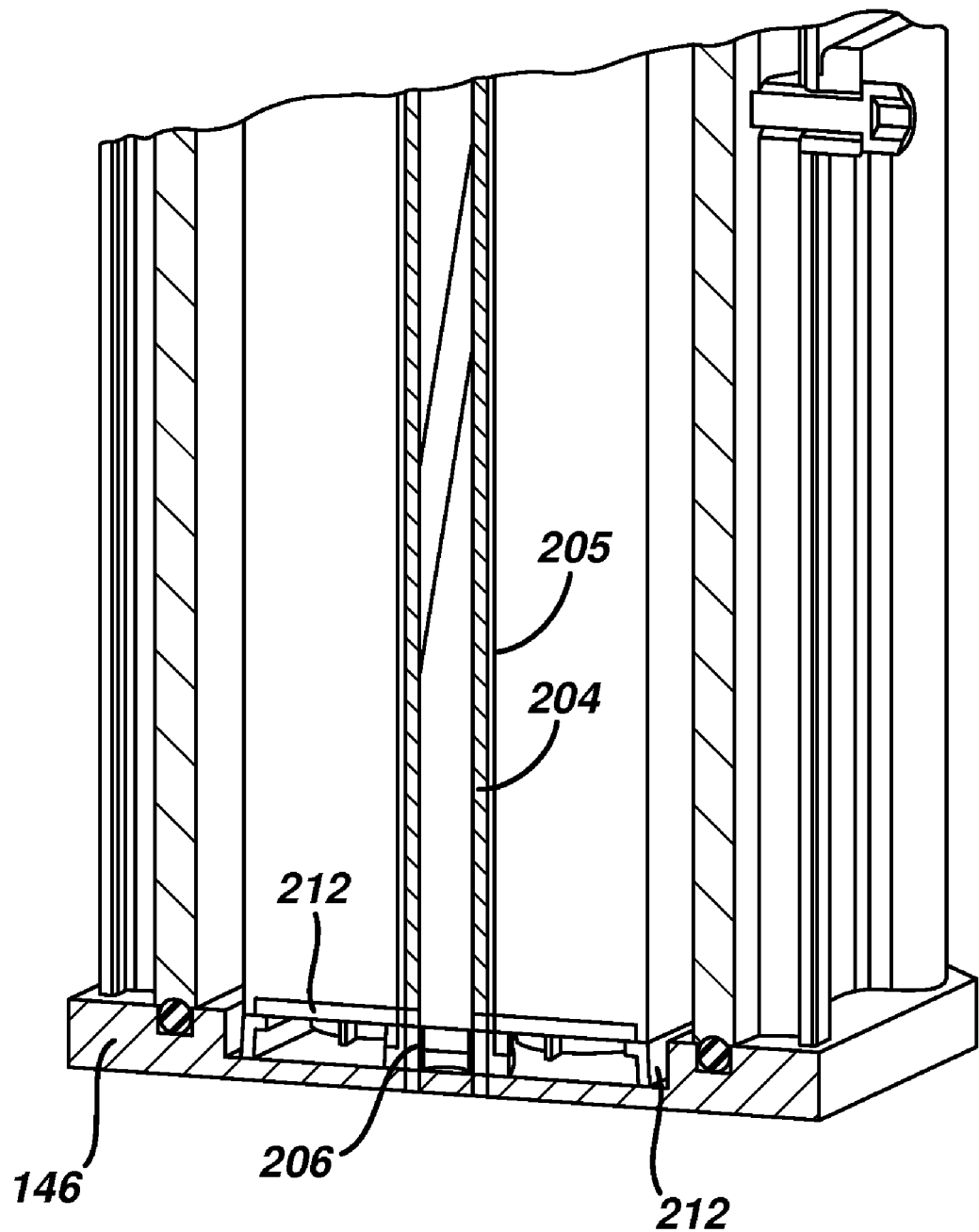
FIG. 16 is a cross-sectional view of a lower portion of the canister shown in FIG. 15.

For example, FIGS. 15 and 16 depict an alternative embodiment of the canister 10 in the form of a canister 200. Components of the canister 200 and the canister 10 that are substantially identical are denoted using identical reference characters.

The canister 200 includes features that facilitate loading and unloading of the pallets 22 on an automated basis. In particular, the canister 200 includes a retaining member 202, a threaded rod 204, a jacket 205, an insert 206, and an acorn nut 208. The jacket 205 is disposed over the rod 204, and is preferably formed from a relatively soft material such as polyvinylchloride (PVC).

The treaded insert 206 is secured to a dummy pallet 212 by complementary threads formed on the dummy pallet 212 and the treaded insert 206. A lower end of the rod 204 engages the insert 206, by way of complementary threads formed on the insert 206 and the rod 204. The flexibility of the jacket 205 permits the portion of the jacket 205 that covers the lower end of the rod 204 to deform and move upwardly in relation to the rod 204, so that threads of the rod 204 can engage the complementary threads on the insert 206.

The pallets 22 can be stacked on the dummy pallet 212, with the rod 204 extending through the respective through holes 22b in each pallet 22. Preferably, the pallets 22 are stacked on the dummy pallet 212, and the rod 204 is subsequently inserted through the through holes 22b. The relatively soft jacket 205 isolates the pallets 22 from the rod 204, and thereby minimizes the potential for the pallets 22 to be damaged by the insertion of the rod therethrough. (The pallets 22 are not depicted in FIG. 15 or 16, for clarity.) The engagement of the dummy pallet 212, the insert 206, and the rod 204 allows the stack of pallets 22 to be lifted by way of the rod 204.

The retaining member 202 and the acorn nut 208 can be threaded to the upper end of the rod 204, as shown in FIG. 16. The acorn nut 208 is preferably secured to the rod 204 by a suitable thread adhesive. Preferably, the rod 204, retaining member 202, and acorn nut 206 are assembled before the rod 204 is inserted through the stack of pallets 22. If desired, an automated device (not shown) can be used to grasp the retaining member 202 or the acorn nut 208, lift and position the assembly so that the rod 204 is substantially aligned with the through holes 22b of the stacked pallets 22, and lower the rod 204 into the stack.

The stack of pallets 22 is trapped between the retaining member 202 and the dummy pallet 212 once the rod 204 has been inserted through the stack of pallets 22. The rod 204 can be secured to the insert 206 by rotating the retaining member 202 or the acorn nut 208, once the threads of the rods 204 and the insert 206 have engaged.

The retaining member 202 can be grasped and carried by an automated arm (not shown) that engages the retaining member 202. This feature can be used to move the stack of pallets 22 to a position above the internal volume 20, and to lower the stack into the internal volume 20 during loading of the canister 200. The automated arm can unload the canister 200 by grasping the retaining member 202 after the lid 28 has been removed, and then lifting the stack of pallets from the internal volume 20.

The retaining member 202 or the acorn nut 208 can subsequently be grasped by another automated device (not shown) and rotated, to unscrew the rod 204 from the insert 206. The retaining member 202 or the acorn nut 208 can then be lifted to remove the rod 204 from the stack.

The dummy pallet 212 rests directly on an inwardly-facing surface of a second end portion 14b of the canister 200 (see FIG. 16). The canister 200 does not include a first or a second end plate 62, 64, in contradistinction to the canister 10. Moreover, the second end portion 14b of the canister 200 has a cutout 212 formed therein for accommodating the dummy pallet 212.

What is claimed is:

1. A canister for degassing a mold piece; comprising:
    a substantially hollow body defining an internal volume;
    a first and a second end portion secured to opposing ends of the body and further defining the internal volume, the first end portion having an opening formed therein for providing access to the internal volume so that the mold piece can be inserted into and removed from the internal volume;
    a lid capable of being secured to the first end portion on a selective basis for covering the opening;
    at least one of a needle valve for allowing gaseous fluid to be introduced into and evacuated from the internal volume, and a membrane in fluid communication with the internal volume so that the membrane can provide an indication of a pressure differential between the internal volume and an ambient environment around the canister;
    and a mating structure on an end portion configured to removably mate to a container wherein said canister forms a sealed interface therewith when mated.

2. The canister of claim 1, wherein the needle valve is disposed in a through hole formed in the lid.

3. The canister of claim 1, wherein the needle valve has a penetration formed therein for allowing a needle injector to be inserted into the internal volume.

4. The canister of claim 1, wherein an underside of the membrane faces a through hole formed in the lid.

5. The canister of claim 4, wherein the membrane is sandwiched between the lid, and a plate mounted on the lid.

6. The canister of claim 5, wherein the plate has a through hole formed therein and having a centerline substantially coincident with a centerline of the through hole formed in the lid.

7. The canister of claim 1, further comprising a plate mounted on the second end portion by way of a spring for supporting the piece of a mold and urging the piece of a mold toward the first end portion.

8. The canister of claim 1, wherein the body is formed from extruded aluminum.

9. The canister of claim 1, further comprising a first seal disposed in a groove formed in the first end portion for sealing an interface between the first end portion and the body, a second seal disposed in a groove formed in the second end portion for sealing an interface between the second end portion and the body, and a third seal disposed in a groove formed in the lid for sealing an interface between the lid and the first end portion.

10. The canister of claim 1, further comprising a fastener extending between the first and second end portions for securing the first and second end portions to the body.

11. The canister of claim 2, wherein a lip is formed proximate a bottom of the through hole for supporting the needle valve.

12. The canister of claim 1, wherein the first portion comprises mating features that permit the first portion to securely engage a glove box.

13. The canister of claim 1, further comprising a latch for securing the lid to the first end portion.

14. The canister of claim 13, wherein the latch comprises a body, and an arm secured to the body for engaging the lid on a selective basis, and the canister further comprises a spacer secured to the first end portion, and a mounting plate secured to the spacer for supporting the body.

15. The canister of claim 1, further comprising a pallet for holding the mold piece, a fitting engaging an underside of the pallet, a rod secured to the fitting and extending through the pallet, and a retaining member coupled to the rod so that the pallet can be lifted by way of the retaining arm, the rod, and the fitting.

16. A device for degassing an object, comprising:
   a substantially tubular first portion having an interior for receiving the object;
   a second portion covering a first end of the first portion;
   a third portion covering a second end of the first portion, the third portion having an opening formed therein for facilitating insertion and removal of the object into and out of the interior of the first portion;
   a valve for placing the interior of the first portion in fluid communication with at least one of a vacuum source and a source of gaseous fluid; and
   a pressure indicator responsive to a pressure differential between the interior and an exterior of the first portion
   and a mating structure on an end portion configured to removably mate to a container wherein said canister forms a sealed interface therewith when mated.

17. The device of claim 16, wherein the valve is a needle valve.

18. The device of claim 16, further comprising a lid for covering the opening.

19. A system for performing degassing operations, comprising:
   a canister having an internal volume for holding a solid object to be degassed, the internal volume capable of being sealed on a selective basis and a mating structure on an end portion configured to removably mate to a container wherein said canister forms a sealed interface therewith when mated;
   a controller comprising a processor; and
   a valve communicatively coupled to the controller for selectively placing the internal volume in fluid communication with at least one of a source of a gaseous fluid suitable for use in degassing, and a vacuum source, in response to an input from the controller.

20. The system of claim 19, further comprising plurality of canisters, and a rack for holding the canisters and the controller.

21. The system of claim 19, further comprising a needle injector in fluid communication with the valve, wherein the canister comprises a needle valve and the needle injector can be placed in fluid communication with the internal volume by way of the needle valve.

22. The system of claim 19, wherein the controller further comprises a memory-storage device communicatively coupled to the processor, and a set of computer-executable instructions stored on the memory-storage device.

23. The system of claim 22, wherein the controller is programmed to direct the valve to open and close on a selective basis to:
   (i) draw a vacuum in the internal volume for a first time period;
   (ii) introduce the gaseous fluid suitable into the internal volume and pressurize the gaseous fluid for a second time period;
   (iii) draw a vacuum in the internal volume for a third time period;
   (iv) introduce the gaseous fluid into the internal volume and pressurize the gaseous fluid for a fourth time period;
   (v) repeat steps (i) through (iii); and
   (vi) subsequently introduce the gaseous fluid into the internal volume and pressurize the gaseous fluid for a fifth time period.

* * * * *

UNITED STATES PATENT AND TRADEMARK OFFICE
CERTIFICATE OF CORRECTION

PATENT NO. : 7,625,197 B2  Page 1 of 1
APPLICATION NO. : 11/224272
DATED : December 1, 2009
INVENTOR(S) : Duis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Twenty-sixth Day of October, 2010

David J. Kappos
*Director of the United States Patent and Trademark Office*